(12) United States Patent
Huang et al.

(10) Patent No.: US 11,295,224 B1
(45) Date of Patent: Apr. 5, 2022

(54) METRICS PREDICTION USING DYNAMIC CONFIDENCE COEFFICIENTS

(71) Applicant: Amazon Technologies, Inc., Seattle, WA (US)

(72) Inventors: Wei Huang, Shoreline, WA (US); Nitin Kesarwani, Seattle, WA (US); Robert Mark Waugh, Seattle, WA (US); Hasan Nuzhet Atay, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1125 days.

(21) Appl. No.: 15/373,369

(22) Filed: Dec. 8, 2016

(51) Int. Cl.
*G06N 7/00* (2006.01)
*G06N 20/00* (2019.01)

(52) U.S. Cl.
CPC ............. *G06N 7/005* (2013.01); *G06N 20/00* (2019.01)

(58) Field of Classification Search
CPC ............................... G06N 7/005; G06N 20/00
See application file for complete search history.

(56) References Cited

U.S. PATENT DOCUMENTS

| 6,278,898 | B1 | 8/2001 | Shah | |
| 8,032,235 | B2 | 10/2011 | Sayyar-Rodsari | |
| 10,003,508 | B1* | 6/2018 | Cogan | H04L 41/5061 |
| 2010/0208063 | A1* | 8/2010 | Lee | G06K 9/00771 |
| | | | | 348/143 |
| 2013/0304392 | A1* | 11/2013 | Deciu | G16B 20/00 |
| | | | | 702/20 |
| 2014/0257924 | A1* | 9/2014 | Xie | G06Q 10/067 |
| | | | | 705/7.31 |
| 2014/0325072 | A1* | 10/2014 | Zhang | H04L 47/823 |
| | | | | 709/226 |
| 2018/0160943 | A1* | 6/2018 | Fyfe | A63B 71/06 |

OTHER PUBLICATIONS

L. Barone, G.Z. Voulgaridis, A.H. Joarder, "One the dispersion of data in nonsymmetric distributions" Dept of mathmatics. University of Lecce, via Arnesano, IJMEST, 35(3), 419-424, 2004. (Year: 2004).*
Ci, Bulpitt, and Round-Off Rule. "Confidence intervals." Lancet 1.8531 (1987): 494-7. (Year: 1987).*

* cited by examiner

*Primary Examiner* — Eric Nilsson
(74) *Attorney, Agent, or Firm* — Robert C. Kowert; Kowert, Hood, Munyon, Rankin & Goetzel, P.C.

(57) ABSTRACT

A method includes obtaining time series data for a usage or performance metric for computing resources in a service provider network comprising a plurality of observations recorded in a plurality of respective time steps. A prediction error is determined for a previous prediction of an observation in the time series data. The prediction error is used to update a standard deviation of a set of predication errors for the usage or performance metric. The standard deviation and the prediction error are then used to update a confidence coefficient. A prediction limit for the usage or performance metric is then determined based on an expected value, the confidence coefficient, and the standard deviation. One or more events may be generated based on the prediction limit, which may be used to trigger a reconfiguration or autoscaling of the computing resources.

20 Claims, 8 Drawing Sheets

---

PREDITION SETTINGS 600

PREDICTION NAME 610: My CPU Prediction
METRIC 620: CPU utilization
DATA PERIOD 630: 1 minute
TIME HORIZON 640: 30 minutes
PREDICTION MODEL 650: [ CPU Model #1 652 ]

PREDICTION BANDS 660: [Symmetric band] / Upper limit / Lower limit 662
○ Static limit 664: within 2% of expected value
○ Fixed confidence coeff 666: within 2 S.D. of initial prediction error distribution
● Dynamic confidence coeff 668: [ SETTINGS 670 ]

[ OK ]

DYAMIC CONFIDENCE COEFFICENT SETTINGS 700

Separate Positive / Negative Prediction Errors 710        Yes ●    No ○

● Exponential Smoothing 720
   Discount Factor 722: 0.1

○ Moving Window of Prediction Errors 724
   Window Size 726: 20 samples

Minimum Coefficient Value 730: 1

Rounding 740        Yes ●    No ○
   Decimal Place 742: 0

METRICS PREDICTION USING DYNAMIC CONFIDENCE COEFFICIENTS

BACKGROUND

A service provider may lease to a client portions of computing resources that the service provider manages. The service provider may manage the computing resources in its service provider network, allowing the resources to be efficiently and securely shared by multiple customers. Virtualization technologies may allow a single physical computing machine to be shared among multiple users by providing each user with one or more virtual machines hosted on the single physical computing machine, with each such virtual machine being a software simulation acting as a distinct logical computing system that provides users with the illusion that they are the sole operators and administrators of a given hardware computing resource, while also providing application isolation and security among the various virtual machines.

The service provider may monitor its computing resources using a resource monitoring service within its service provider network to collect and track usage and performance metrics generated from the operation of physical or virtual machines in the service provider network. The collected metrics may be made available to both the service provider and the client for planning and analysis purposes. In some cases, a client may wish to make planning decisions based on predicted values of certain metrics at a time in the future. For example, collected metrics data may predict that storage utilization for the client may reach a certain level by a future date. Such information may be used by the client to gradually scale the storage resources provided by the service provider. However, accurate predictions of usage and performance metrics for computer resources are generally difficult to make. In fact, even the level of the uncertainty itself may fluctuate over time in an unpredictable fashion. These problems are particularly pronounced in the prediction of usage and performance metrics for computing resources, due to the volatility of such data and the speed with which such data is generated. The difficulties generally reduce the usefulness of predictions in this setting.

BRIEF DESCRIPTION OF THE DRAWINGS

FIG. 7 illustrates a user interface to configure prediction settings in a metrics prediction system, according to some embodiments.

Figure 1:
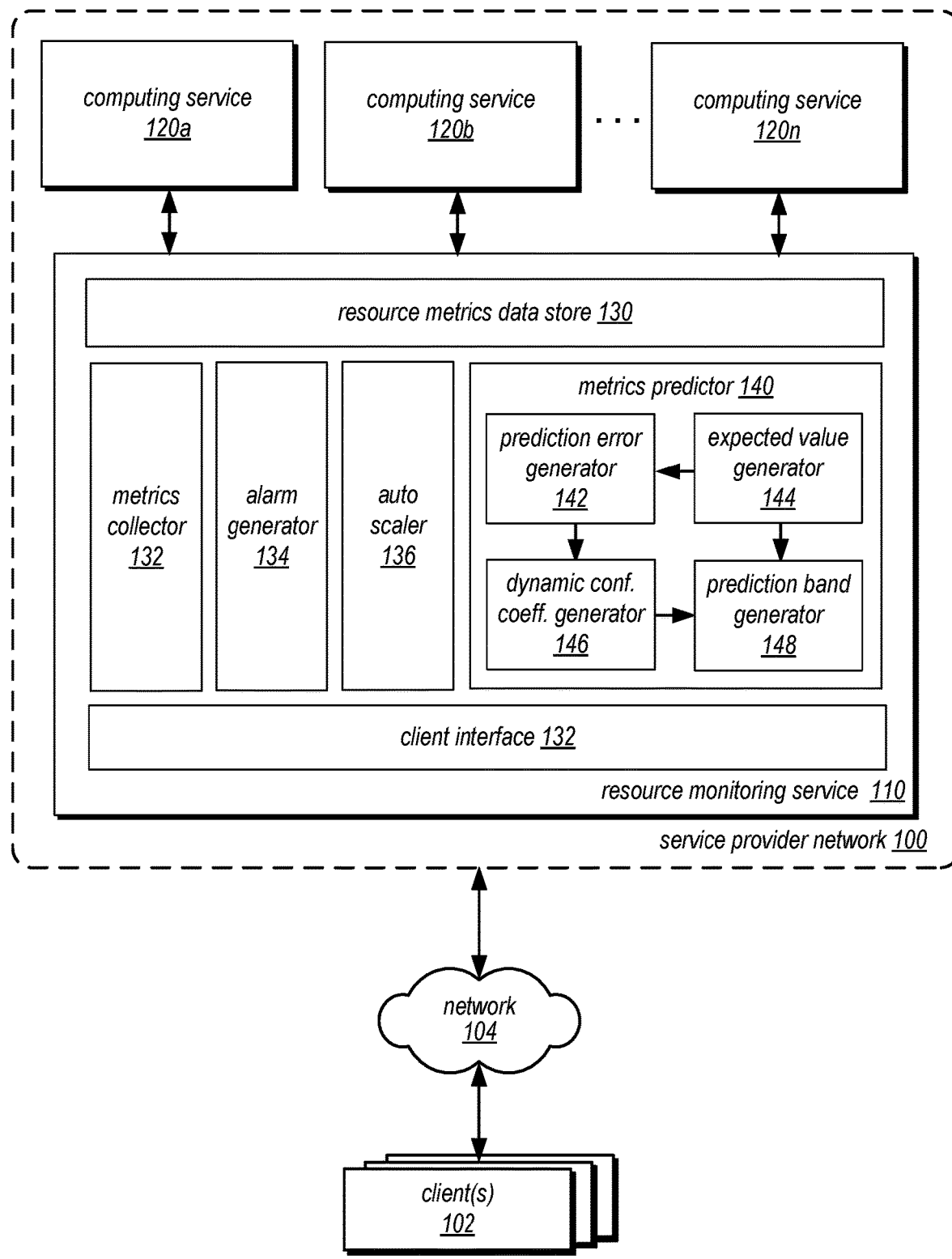
FIG. 1 is a block diagram illustrating an example computer system that includes metrics prediction, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of prediction systems are disclosed herein to predict the value of usage and performance metrics of computing resources in a service provider network using a dynamic confidence coefficient. The prediction system may collect performance and usage metrics data from computer resources as time-series data in regular time steps. Based on the time-series data, the prediction system may repeatedly generate expected values for the metrics for a fix time horizon (e.g., a two-hour forecast horizon). The expected values may be generated in real time and at a high frequency (e.g., a prediction time step of 10 seconds). The prediction system may also generate prediction bands around the expected values, which represent the range of uncertainly of a prediction. Such a prediction system is useful in a number of contexts. For example, the prediction system may be used to detect outliers in the metrics data, by checking if an observed value for a metric falls outside of a corresponding prediction band. As another example, the prediction system may be used for computing resource capacity planning, by causing certain actions to be performed based on predictions. Such actions may include for example generating an alert to a user or performing an auto scaling action to adjust the computing resources.

In such a prediction system, the prediction bands may be determined using a confidence coefficient that may be multiplied to a standard deviation of past prediction errors (i.e., expected value minus the observed value). In other words, a standard deviation is first determined from a distribution of past prediction errors. The standard deviation is then multiplied with the confidence coefficient to determine the prediction band around the expected value. In some embodiments disclosed herein, the confidence coefficient may be determined in a dynamic fashion based on the changing distribution of the prediction errors. This dynamic determination allows the prediction system to adapt to the changing nature of time-series data as it makes repeated predictions from the data. The determination of the dynamic confidence coefficient adds little computational cost to the continuous process, as it may be piggybacked on the calculations performed during the process. The adaptive process is particularly suited to a prediction system for predicting performance and usage metrics, which collects large amounts of metrics data that may be volatile and then uses that metrics data to generate prediction bands at a high frequency.

FIG. 1 is a block diagram illustrating an example computer system that includes metrics prediction, according to some embodiments. The system may include a service provider network 100 and one or more clients 102. The service provider network 100 may provide computing resources via one or more computing services 120a-n to clients 102 over network 104.

The service provider network 100 may be operated by an entity to provide one or more services, such as various types of cloud-based computing or storage services, accessible via the Internet and/or other networks to clients 102. Service provider network 100 may include numerous data centers hosting various resource pools, such as collections of physical and/or virtualized computer servers, storage devices, networking equipment and the like, needed to implement and distribute the infrastructure and services offered by the service provider network 100. In some embodiments, service provider network 100 may provide computing resources. These computing resources may in some embodiments be offered to clients 102 in units called "instances," such as virtual compute instances.

The clients 102 may encompass any type of client configurable to submit requests to the service provider network 100. For example, a given client 102 may include a suitable version of a web browser, or may include a plug-in module or other type of code module configured to execute as an extension to or within an execution environment provided by a web browser. Alternatively, a client 102 may encompass an application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 102 may be configured to generate network-based services requests according to a Representational State Transfer (REST)-style network-based services architecture, a document- or message-based network-based services architecture, or another suitable network-based services architecture. In some embodiments, a client 102 (e.g., a computational client) may be configured to provide access to a computing service 120 in a manner that is transparent to applications implemented on the client 102 utilizing computational resources provided by the computing service 120.

The clients 102 may convey network-based services requests to the service provider 100 via network 104. In various embodiments, network 104 may encompass any suitable combination of networking hardware and protocols necessary to establish network-based communications between clients 102 and service provider network 100. For example, a network 104 may generally encompass the various telecommunications networks and service providers that collectively implement the Internet. A network 104 may also include private networks such as local area networks (LANs) or wide area networks (WANs) as well as public or private wireless networks. For example, both a client 102 and the service provider network 100 may be respectively provisioned within enterprises having their own internal networks. In such embodiments, the network 104 may include the hardware (e.g., modems, routers, switches, load balancers, proxy servers, etc.) and software (e.g., protocol stacks, accounting software, firewall/security software, etc.) necessary to establish a networking link between the client 102 and the Internet as well as between the Internet and service provider network 100. In some embodiments, clients 102 may communicate with service provider network 100 using a private network rather than the public Internet.

The computing services 120 offered by the service provider network 100 may include a variety of types of services that allows clients 102 to use computing resources in the service provider network 100 for a variety of purposes. These computing services 120 can, for example, provide access to generic compute instances. Computing services 120 can also provide access to specialized compute instances with specialized functionality, such as routers, domain name systems (DNSs), load balancers, desktop virtualization servers, and the like. The computing services 120 may include various types of storage services that expose different types of storage access interfaces, including block-based storage services, relational database services, NoSQL database services, file system services, and the like. Computing services 120 may also include services that provide functionalities of commonly used software modules, which can be used in conjunction with other software to implement larger systems. For example, computing services 120 may include queuing services, notification services, logging services, key storage and management services, and the like. The computing services 120 may include services that implement larger systems with sophisticated functionality, such as machine learning, identity management, software development environments, multi-tenant containers for hosting software tenants, and the like. The computing services 120 may be standard services provided by the service provider, or services implemented by third parties on top of the standard services. The computing services 120 generally operate on computing resources of the service provider network 100, and may be controlled and configured by clients 120 via various interfaces such as graphical user interface (GUI) (e.g., as part of an administration control panel or web site) and/or as a programmatic interface such as an Application Programming Interface (API). As the computing services 120 operate on the service provider's computing resources, usage or performance metrics data may be generated and captured.

In some embodiments, service provider network 100 may include a resource monitoring service 110. Resource monitoring service 110 may track and provide client access to various metrics data captured from the operation of computing services 120 on the service provider's computing resources. The generated metrics may be collected from the computing resources via a metrics collector 132. The metrics collector 132 may operate as a centralized process that periodically polls the computing resources in the service provider network 100 for metrics data. In some embodiments, the metrics collector 132 may rely on processes operating on the computing resources themselves, which may push metrics data back to the metrics collector 132. The collected metrics may be stored in a resource metrics data store 130, which may be implemented as a database, a set of log files in a file system, or another type of suitable storage system. Metrics data may be maintained on the resource metrics data store 130 for a specified period of time, before they are archived or discarded.

A metric may represent a type of data that can be captured from a computing resource. The metric may be represented as time-series data comprising a set of data points that are observed at regular time steps by a periodic polling process. For example, a metric may indicate the CPU utilization of a compute instance, captured in one-minute intervals. As another example, a second metric may indicate the latency of a load balancing instance in the service provider network 100. A metric may be associated with a name and a namespace, or one or more other dimensions, which may be used to uniquely identify a metric across a plurality of clients and computing resources. A metric may be part of a standard set of metrics defined by the service provider, or a custom metric defined by a client. For example, a client may define a custom metric that tracks the number of calls made to a client-specific API. The resource monitoring service 100 may monitor the metrics and make the collected results available to a client.

The resource monitoring service 110 may allow clients 102 to create and manage alarms based on the metrics. The resource monitoring service 110 may include an alarm generator 134 that maintains a plurality of enabled alarms. Alarms in the resource monitoring service 110 may be defined to trigger in response to certain alarm conditions. The conditions may depend on, for example, metrics data for certain computing resources are collected via the metrics collector 132. In one example, if the value of a metric exceeds a given threshold is detected for a specified number of time periods, an alarm is triggered. Alarm conditions may also depend on other data, such as data captured through other means, user actions, data that is generated based on the metrics data, the current time, or the like. When the alarm conditions are met, the alarm generator 134 may generate an associated alarm. The generated alarm may be transmitted to a client or administrator of the service provider network 100 via email or text message. The alarm generator 134 may also generate log triggered alarms. The alarm log may be made available to the service provider or the clients 102 via one or more interfaces such as GUIs, APIs, or more sophisticated analysis tools.

The resource monitor service 110 may also generate events other than alarms. In some embodiments, the service provider network 110 may implement an event notification service through which generated events can be transmitted to a group of registered modules or entities. The events may be sent via callbacks defined by an API exposed by the service provider network 100, such that registered software modules can receive these events. The software receiving these notifications may take appropriate actions programmatically, depending on the event.

In some embodiments, the resource monitoring service 110 may implement an auto scaler 136 that can programmatically respond to metrics events. The auto scaler 136 may be implemented as part of the resource monitoring service 110 or separate from the resource monitoring service 110. The auto scaler 136 may provide an auto scaling function for a group of compute instances that are provided to a client 102, based on an auto scaling policy. For example, auto scaling may be used to ensure that a client's application is assigned a sufficient number of instances to handle the application's current or expected load. A client 102 may define an auto scaling group for the client application, which may specify a minimum and a maximum number of instances in the group. As another example, a client 102 may specify a minimum and maximum storage capacity for a particular auto scaling group of storage resources. The client 102 may then define an auto scaling policy that specifies the conditions under which computing resources are added to or removed from the group. In some cases, the auto scaling policy may specify that certain computing resources are reconfigured under certain conditions. These conditions may be specified based on metrics collected from instances in the current auto scaling group. When the conditions are met, an event is generated and received by the auto scaler 136, causing the auto scaler 136 to perform an auto scaling action. In this manner, the resource monitoring service 110 may adjust the auto scaling group programmatically, depending on the changing operational metrics of the client application.

In some embodiments, the resource monitoring service 110 may implement a client interface 132. Client interface 132 may be configured to process incoming requests received from clients 102 and provide output back to the clients 102. For example, collect metrics data may be made available to a client 102 via the client interface 132. The metrics data may be presented to the client 102 in via a variety of channels, such as GUIs, APIs, log files, or more sophisticated analysis tools. The client interface 132 may also allow clients 102 to manage and configure operations of the resource monitoring service 110. For example, the client interface 132 may present a GUI to a client 102 to allow the client to define one or more metrics to be tracked, configure the parameters of the tracking, and define one or more alarms based on the metrics. The client interface 132 may be a network-based interface and may be implemented as one or more GUIs or APIs. In some embodiments, client interface 132 may be implemented as part of a frontend module or component dispatching requests to the various other components, such as the alarm generator 134, the resource metrics data store 130, or the metrics predictor 140.

The resource monitoring service 110 may implement a metrics predictor 140, which may be used to analyze collected metrics data and generate predictions for particular metrics in the future. The predictions may be made based on one or more prediction models and the set of metrics data stored in the resource metrics data store 130. The prediction model may be a time-series prediction model such as an autoregressive integrated moving average (ARIMA) model. The prediction model may employ an exponential smoothing method such as the Holt-Winters forecasting method. Certain parameters of the prediction model, such as for example an initial value for a confidence coefficient used to determine prediction bands, may be determined based on the existing metrics data.

The prediction of a metric may occur repeatedly and regularly in regular time steps as new observations of metrics data are received. Each prediction may produce an expected value of a metric at a particular time in the future from the time of the prediction, for example, 10 time steps from the current time. In this way, the prediction process may operate in parallel with the metrics monitoring process, maintaining a prediction time horizon of a certain number of time steps ahead in the future. In some cases, the prediction time step may be the same length as the observation time step for a tracked metric, such that each new observation of the metric is used to produce a new prediction of the metric. Predictions generated by the metrics predictor 140 may be stored in the resource metrics data store 130.

The metrics predictor 140 may receive input from the clients 102 to configure the predictions of metrics. The metrics predictor 140 may provide output the clients 102 regarding the results of the predictions. The input and output may be communicated via the client interface 132, and may be communicate in any formats, such as GUIs, APIs, log files, or one or more analysis tools. In particular, the metrics predictor 140 may include analysis tools to generate statistics from the predictions. The metrics predictor 140 may also render graphs of the collected metrics, the prediction of the metrics, and other statistical data, which may be provided to clients 102 via GUIs. The metrics predictor 140 may also perform certain analysis and provide expert recommendations to clients 102 based on the collected metrics, predictions, and/or statistics. For example, the metrics predictor 140 may determine that the predicted latency of a certain computing service 120 will be unacceptably high for a period of time in the future, and recommend an upgrade of the instances supporting the service 120 a particular date.

Like the collected metrics, the predictions of the metrics may be used to cause the generation of events. An alarm is one type of event. An alarm may be defined such that it is triggered when the predicted value of a metric at a certain time horizon exceeds a set threshold. For example, a client 102 may communicate with the alarm generator 134 to create an alarm that is triggered when the predicted storage utilization of a storage device exceeds 90% of a provision limit for three consecutive prediction time steps. As another example, an event may be generated when an actual observation of metrics data falls outside the prediction band for that observation. For example, the metrics predictor 140 may predicted that the CPU utilization at a particular time will be between 50% to 60%, and if the observed CPU utilization at that time outside of that 50% to 60% prediction band, the alarm generator 134 may generate an alarm. Such outlier detection alarms are useful for detecting unusual activity on the computing resources. The alarm may be transmitted to a client 102 or an administrator. An alarm may also be logged in an alarm log.

In another example, an event other than an alarm may be generated upon certain predictions. For example, an event may be generated based on a prediction. The event may be transmitted through an event notification service operating within the service provider network. The event may be received by software components registered to receive events of that type. These software components may then perform programmatic actions based on the received event. In one example, the receiving software component may be an auto scaler that can modify an auto scaling group of computing resources by, for example, adding or removing resources to the group, or reconfiguring particular resources within the group. In this manner, the service provider network may perform actions to remedy a potential problem with the computing resources before the problem actually materializes.

The metrics predictor 140 may include an expected value generator 144 to determine an expected value for a metric at a time in the future, based on past data and a prediction model. At that time in the future, an actual observation of that metric may be collected via the metrics collector 132. At that point, a prediction error generator 142 may determine a prediction error between the expected value and the value seen in the observation. In a process where predictions are being generated continuously for a time horizon, prediction errors may be determined continuously. The prediction error $e_n(h)$ for a prediction may be determined as:

$$e_n(h) = x_{n+h} - \hat{x}_n(h)$$

where h is the time horizon, $x_{n+h}$ is the observed value of a metric at time (n+h); and $\hat{x}_n(h)$ is the expected value of the metric at the time horizon, predicted at time n.

The prediction error is an indication of uncertainty in the prediction process. To account for this uncertainly in a prediction, the metrics predictor 140 may include a prediction band generator 148 to generate a prediction band for each expected value. The prediction band may comprise an upper limit and a lower limit around an expected value of the metric. The upper and lower limits are determined such that the actual value of the metric in the future is expected to fall within the prediction band, by a certain probability. In practice, events or alarms may be configured to be triggered based on the values of the upper or lower limits rather than the expected value itself.

In a situation where observations for a metric are taken repeatedly, and predictions of the metric are made repeatedly, the width of the prediction band may be adjusted according to the prediction errors. For example, the upper and lower limits of the prediction band may be determined using the following formulas:

$$\text{upper}(h) = \hat{x}_n(h) + z_{\alpha/2} \cdot \sigma(e_n^+(h))$$

$$\text{lower}(h) = \hat{x}_n(h) - z_{\alpha/2} \cdot \sigma(e_n^-(h))$$

where $\hat{x}_n(h)$ denotes the expected value of a metric at time h; $e_n^+(h)$ and $e_n^-(h)$ denote sets of positive and negative prediction errors for the metric, respectively; $\sigma(e_n^+(h))$ and $\sigma(e_n^-(h))$ denote the standard deviations of the two sets of prediction errors respectively; $z_{\alpha/2}$ denotes a confidence coefficient that corresponds to a desired percentage point of a standard normal distribution $\sigma(e_n(h))$; and upper(h) and lower(h) denote the upper and lower limits of the prediction band. Assuming that the prediction error $e_n(h)$ follows a normal distribution, the upper and lower limits shown above should capture the actual observed value for the metric at a probability of 100(1−α) %.

In the above formula, the confidence coefficient $z_{\alpha/2}$ may be chosen during an initial training period for the prediction model, before the start of the continuous prediction process. The initial training of a prediction model may be based on a set of initial observations of the metric. An initial set of predictions may be made from the initial observations, and a distribution of the initial prediction errors may be determined. Based on this distribution, an initial confidence coefficient $z_{\alpha/2}$ may be determined.

The above process performs well in situations where the prediction error $e_n(h)$ follows a normal distribution. However, in some situations, the prediction errors $e_n(h)$ experienced during an actual run of the continuous prediction process may not follow a normal distribution. This may occur, for example, when data for a metric behaves in a way that was not foreseen during the initial training of the prediction model. This may also happen when data for a metric becomes extremely volatile for particular time periods. In such situations, a fixed confidence coefficient $z_{\alpha/2}$ may produce a prediction band that is too narrow or too wide, depending on the behavior of the metric during actual prediction.

One approach to dealing with this problem is to employ density forecasting techniques to estimate the entire probability distribution of possible values of the metric in the future at every prediction. However, such estimations may be too computationally expensive to be used for generating predictions at a high frequency In some embodiments, the metrics predictor 140 may include a dynamic confidence coefficient generator 146 to determine a dynamic confidence coefficient. The dynamic confidence coefficient may be updated to adapt to prediction errors seen during the prediction process. In other words, the prediction band may be allowed to adjust based on the prediction errors seen during the actual prediction process, so that it can widen or narrow appropriately. Such an approach may be implemented using the following formulas. First, the dynamic confidence coefficient generator 146 may calculate dynamic multipliers $m_u$ and $m_l$, as follows:

$$m_u(n) = \beta \cdot m_u(n-1) + (1-\beta) \cdot \max\left(\frac{e_{n-h}(h)}{\sigma(e_{n-h}^+(h))}, z_{\alpha/2}\right)$$

$$m_l(n) = \beta \cdot m_l(n-1) + (1-\beta) \cdot \max\left(\frac{e_{n-h}(h)}{\sigma(e_{n-h}^-(h))}, z_{\alpha/2}\right)$$

where $e_{n-h}(h)$ denotes the error of a prediction of a metric made at time (n–h); $e_{n-h}^+(h)$ and $e_{n-h}^-(h)$ denote the sets of positive and negative prediction errors, respectively; $\sigma(e_{n-h}^+(h))$ and $\sigma(e_{n-h}^-(h))$ denote the standard deviations of the two sets of errors, respectively; $z_{\alpha/2}$ denotes an initial value for the confidence coefficient; $0<\beta\leq 1$ is a weight factor; $m_u(n-1)$ and $m_l(n-1)$ are the upper and lower dynamic confidence coefficients used in a previous prediction of the metric at time (n–1); and $m_u(n)$ and $m_l(n)$ are the upper and lower dynamic confidence coefficients that are to be used at time n to determine the upper and lower limits of the prediction band.

A number of features can be seen from these formulas. First, the dynamic confidence coefficients $m_u(n)$ and $m_l(n)$ are determined based on the dynamic confidence coefficients $m_u(n-1)$ and $m_l(n-1)$ used in a previous prediction at time (n–1), discounted using the weight factor $\beta$. This dependence on previous values provides an exponential smoothing of the value for the dynamic confidence coefficients over time, so that the value does not change abruptly in response to a large change in a single prediction error. The larger the value of the weight factor $\beta$, the larger the smoothing effect.

Second, the formulas use the initial value $z_{\alpha/2}$ as a minimum to prevent the dynamic confidence coefficients from falling below that value. Thus, even if the prediction errors reach zero during a time period, the prediction band stays above at least a minimum width.

Third, the ratio of the new prediction error to the standard deviation of past errors allows the confidence coefficient to adapt to changing prediction error values. As new prediction errors $e_{n-h}(h)$ arrive, they are compared to the standard deviations of positive and negative prediction errors $\sigma(e_{n-h}^+(h))$ and $\sigma(e_{n-h}^-(h))$ to produce two intermediate values for the positive and negative confidence coefficients. The intermediate values correspond to a confidence interval in for the prediction error distribution that is wide enough to capture the new prediction error. The intermediate values are then smoothly incorporated into the resulting confidence coefficients.

Using the updated upper and lower dynamic confidence coefficients above, the upper and lower limits for the prediction band may be determined by the prediction band generator 148 using the following formulas:

$$\text{upper}(h)=\hat{x}_n(h)+m_u(n)\cdot\sigma(e_n^+(h))$$

$$\text{lower}(h)=\hat{x}_n(h)-m_l(n)\cdot\sigma(e_n^-(h))$$

where $\sigma(e_n^+(h))$ and $\sigma(e_n^-(h))$ denote the standard deviation of the sets of positive and negative prediction errors, respectively; $m_u(n)$ and $m_l(n)$ are upper and lower dynamic confidence coefficients; $\hat{x}_n(h)$ denotes the expect value of the metric value; and upper(h) and lower(h) denote the upper and lower limits of the prediction band at time h.

During the prediction process, the prediction bands determined according to the above formulas may exhibit an adaptive behavior that changes with the performance of the predictions. For example, during a period of relative stability in the data where the prediction errors are low, the prediction band may narrow to provide more precise predictions. Conversely, during a period of relative volatility when the prediction errors are high, the prediction band may widen to indicate the added uncertainly in the predictions. In the context of the monitoring of computing resource metrics in a service provider network, the use of dynamic confidence coefficients produces less false alarms during periods of high prediction error and more sensitive alarms during periods of low prediction error. Further, the above-described approach is not excessively compute intensive because each of the dynamic confidence coefficients at each prediction step simply builds upon the findings of a previous prediction step. This feature makes the approach particularly suitable for a real-time metrics prediction application, where predictions are made at a high frequency.

It should be noted that although the above dynamic approach is explained herein using the formulas above, the formulas themselves are not intended to limit on the full breadth of the inventive concepts described herein. A person of ordinary skill in the art would recognize that the inventive concepts described herein may be implemented using numerous variations and combinations thereof without departing from the spirit of the inventive concepts.

For example, in some embodiments, the upper and lower dynamic confidence coefficients $m_u(n)$ and $m_l(n)$ may be rounded to eliminate unneeded precision in these values and facilitate their usage with other operands. In some embodiments, the dynamic confidence coefficients may be rounded up to an integer that is the nearest larger integer.

In some embodiments, the above process may determine a prediction band with symmetric upper and lower prediction limits. In this case, a single standard deviation may be determined based on a set of both positive and negative prediction errors. Instead of computing two dynamic confidence coefficients $m_u(n)$ and $m_l(n)$, a single dynamic confidence coefficient, m(n), may be determined from the standard deviation. Instead of two prediction limits upper(h) and lower(h), a single limit may be determined for the prediction band at time horizon h, based on the dynamic confidence coefficient m(n).

In some embodiments, the standard deviations $\sigma(e_n^+(h))$ and $\sigma(e_n^-(h))$ may be determined based on a subset of the previous prediction errors for the metric. For example, the standard deviations may only take into account a set of the most recent prediction errors for the metric. The set may be limited to a predetermined size that is configurable by the client 102. Thus, in this variation, the prediction performance is only measured in terms of recent predictions. With fewer predictions error samples, the standard deviation of the set stays relatively large. This variation may lead to prediction bands that stays wider over time and can adjust more freely over time.

Figure 2:
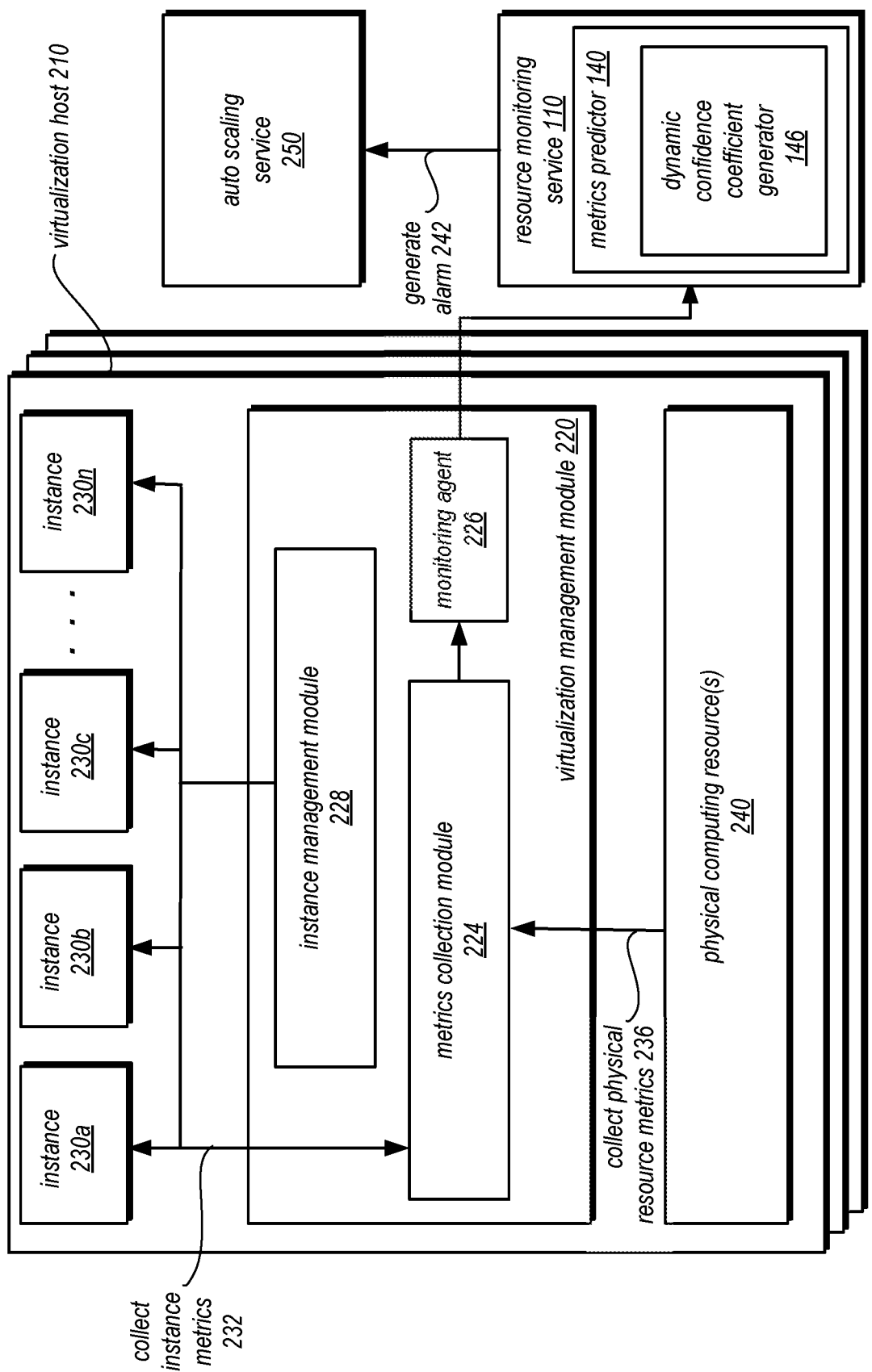
FIG. 2 is a block diagram illustrating an example computer system that includes metrics prediction, according to some embodiments.

FIG. 2 is a block diagram illustrating an example computer system that includes metrics prediction, according to some embodiments. As illustrated, the computer system may include a plurality of virtualization hosts. A virtualization host 210 may implement and/or manage multiple compute instances 230*a*, 230*b*, 230*c* . . . 230*n*. A virtualization host 210 and may be one or more computing devices comprising physical computing resources 240, such as a system described below with regard to FIG. 8. A virtualization host 210 may include a virtualization management module 220 capable of instantiating and managing a number of different client-accessible virtual machines instances 230*a-n*. The virtualization management module 220 may include, for example, a hypervisor and an administrative instance of an operating system, which may be termed a "domain-zero" or "dom0" operating system in some implementations. The dom0 operating system may not be accessible by clients on whose behalf the virtual machine instances 230 are run. The dom0 operating system may be responsible for various administrative or control-plane operations of the service provider, including for example capturing usage and performance metrics data from the instances 230*a-n* and underlying physical computing resources 240.

An instance 230 may comprise one or more servers with a specified computational capacity (which may be specified by indicating the type and number of CPUs, the main memory size, and so on) and a specified software stack (e.g., a particular version of an operating system, which may in turn run on top of a hypervisor). One or more different computing devices may be used singly or in combination to implement the instances 230*a-n* on the virtualization host 210. The computing devices may include general purpose or special purpose computers, storage devices, network devices and the like.

The instances 230*a-n* may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client applications.

Different types of instances 230*a-n* may be offered by the service provider. Different instances 230*a-n* may have different numbers of virtual CPU cores, and different amounts of memory, cache, storage and/or networking capacity, as well as any other performance characteristic. Configurations of instances 230*a-n* may include their location, in a particular data center, availability zone, geographic, location, etc., and (in the case of reserved compute instances) reservation term length.

The virtualization management module 220 may include a metrics collection module 224, a monitoring agent 226, and an instance management module 228. Although these modules are shown as implemented inside the virtualization management module 220, they may also be implemented outside of the virtualization management module 220, for example, as a process separate from the hypervisor. Further, some of the modules may be implemented together without clearly defined interfaces separating the modules. For example, the metrics collection module 224 and the monitoring agent 226 may be implemented as a single module that performs the function of both, as described herein.

The metrics collection module 224 may collect data for various metrics, both from the instances 230 being hosted on the virtualization host 210 as shown in path 232, and from the underlying physical resources 240 as shown in path 236. The collected metrics may relate to the usage and performance of various aspects of the instances 230 or the underlying physical resource 240, including data associated with the CPU, memory, swap, disk activity, network traffic, load balancing, file system, and/or custom metrics of particular applications or services. The metrics collection module 224 may operate as an executable process or thread that periodically collects metrics data from the instances 230 and the physical resources 240. The collected data may be staged at a temporary storage location on the virtualization host 210.

The monitoring agent 226 may receive the collected data from the metrics collection module 224 and transmit the data to the resource monitoring service 110. The monitoring agent may operate as an independently executable process or thread or as a part of a process or thread that includes the metrics collection module 224. The monitoring agent 226 may actively push the metrics data to the resource monitoring service 110, or transmit the metrics data in response to requests from the resource monitoring service 110. In some embodiments, the metrics collection module 224 may simply store the collected metrics in one or more log files, which may be periodically retrieved by the resource monitoring service 110. In some embodiments, the monitoring agent 226 may transmit the collected metrics data over a network connection, either in bulk form on a periodic basis or continuously as a stream. The collected metrics data may be transmitted in any format, and may be compressed and/or encrypted before being transmitted.

The resource monitoring service 110 may be a centralized service that aggregates metrics data collected from a plurality of virtualization hosts 210. The resource monitoring service 110 may actively retrieve the collected metrics data from each virtualization host 210 or passively receive the collected metrics data from the virtualization hosts 210. As discussed in connection with FIG. 1, the resource monitoring service 110 may store the collected metrics in a resource metrics data store 130, which may be accessible to the metrics predictor 140. The metrics predictor 140 may be configured to generate predictions of metrics based on the collected metrics data, using dynamic confidence coefficients to determine prediction bands. The dynamic confidence coefficients may be dynamically updated based on past prediction errors, via a dynamic confidence coefficient generator 146. As discussed, the dynamic confidence coefficients may be used to adapt the prediction bands to changing conditions in the metrics data during a continuous prediction process. The metrics predictor 140 may also be configured to generate events or alarms 242 via the alarm generator 134. The events or alarms may be generated based on the collected metrics data, any prediction data generated by the metrics predictor 140, other data, or a combination thereof. Generated events may be transmitted via an event notification service operating within the service provider network 100.

In some embodiments, the service provider network 100 may include an auto scaling service 250. The auto scaling service 250 may be implemented as an independently executable process or thread or a part of the resource monitoring service 110. The auto scaling service 250 may asynchronously receive events generated from the auto scaling service 250, and determine that an event requires a configuration change to be implemented on one or more virtualization hosts 210. In some embodiments, the configuration change may include changing an operating parameter of an instance 230 operating on a virtualization host 210, or an operating parameter of the physical resources of a virtualization host 210. In some cases, the configuration change may cause an instance 230 to leave or join an auto scaling group created for one or more applications or services, according to an auto scaling policy. In this way, virtual machine instances may be provisioned to or deprovisioned from applications or services. In other cases, the configuration change may cause instances 230 or virtualization hosts 210 to be started, stopped, or rebooted. In yet other cases, an event may cause other computing resources to be reconfigured. For example, an event may cause a storage device to be configured to cause additional storage space to made available to an application or service. The auto scaling service 250 may transmit the configuration changes to the virtualization host 210 via an API, a network protocol, or any other suitable communication methods.

The configuration change transmitted by the auto scaling service 250 may be transmitted an instance management module 228 operating on the virtualization host 210. The instance management module 228 may operate as an independently executable process or thread or a part of the virtualization module 220. The instance management module 228 may expose an API or respond to a protocol that allows remote services to control and/or configure the virtualization host 210 or instances 230*a-n* operating on the virtualization host 210. When configuration change messages or calls are received by the instance management module 228, the module may perform the change on the virtualization host 210. These configuration changes may include operations such as provisioning and deprovisioning instances 230 from an auto scaling group for an application, starting, stopping, or rebooting instances or the virtualization host itself, or any other type of configuration changes. In other embodiments, the instance management module 228 may reconfigure computing resources as requested by the auto scaling service 250.

The system described in FIG. 2 may be configured to implement a self-monitoring and self-configuring system that continually extract operational metrics, make predictions of the metrics, and make configuration adjustments based on the predictions. In such prediction systems, a metrics predictor may be configured to dynamically adjust prediction bands using dynamic confidence coefficients, as described above in connection with FIG. 1. This feature is particularly advantageous for systems such as the system of FIG. 2, where metrics predictions generated continuously and at a high frequency, and prediction errors can vary widely from time to time.

Figure 3:
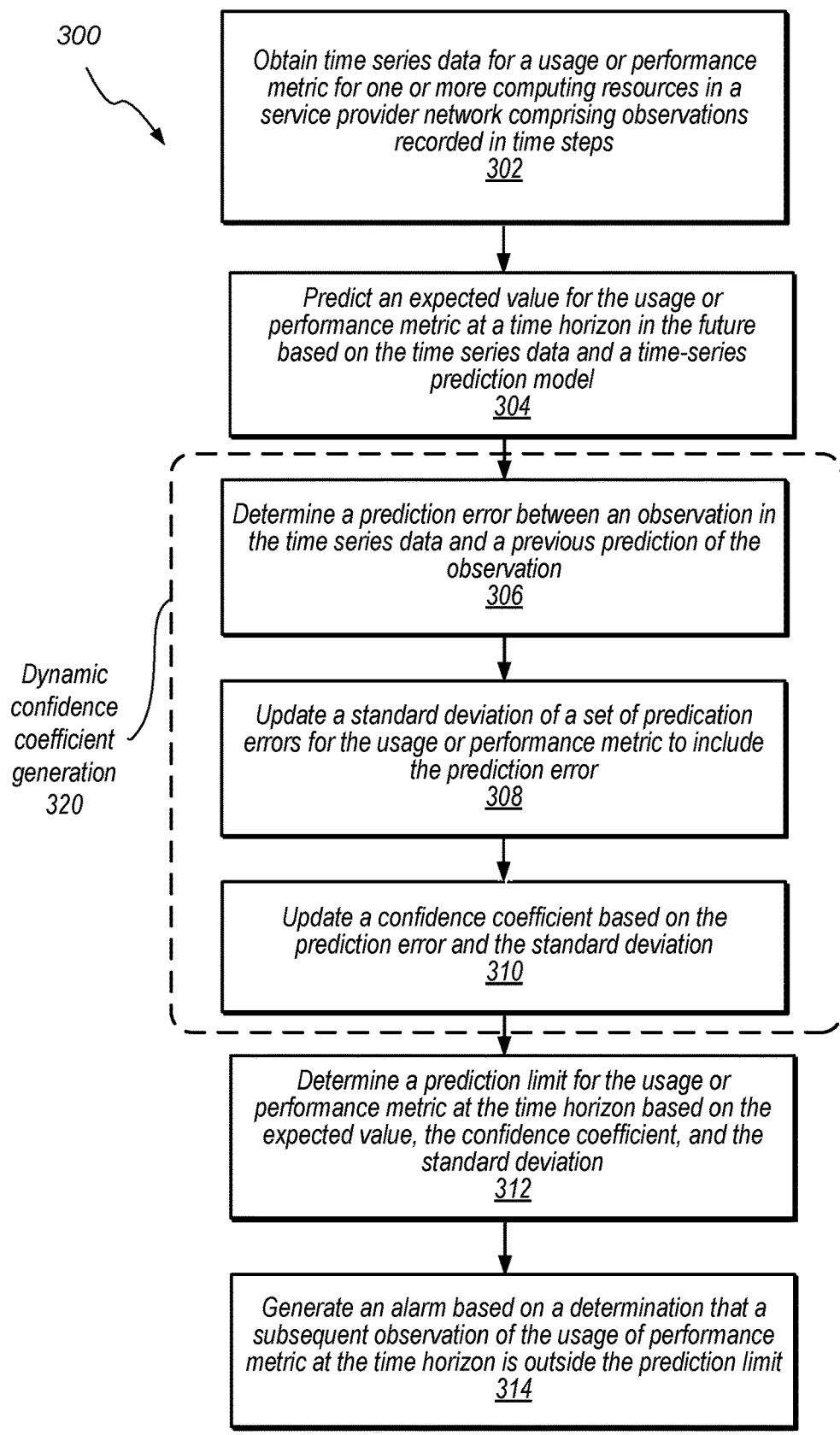
FIG. 3 is a flowchart diagram illustrating a process of operating a metrics prediction system, according to some embodiments.

FIG. 3 is a flowchart diagram illustrating a process of operating a metrics prediction system, according to some embodiments. Process 300 begins at operation 302, where time series data for a usage or performance metric for one or more computing resources in a service provider network is obtained by a metrics collector. The time series data may comprise a plurality of observations recorded in a plurality of respective time steps. For example, a metric may be collected that indicates the CPU utilization of a compute instance, captured in one-minute intervals.

At operation 304, an expected value for the usage or performance metric at a future time horizon is predicted based on the time series data and a time-series prediction model. The time-series prediction model may be an autoregressive integrated moving average (ARIMA) model, or another type of prediction model. The prediction model may employ an exponential smoothing method such as the Holt-Winters forecasting method.

Operations 306 to 310 represents a series of operations that implements a dynamic confidence coefficient generation process 320. This process may be performed by the metrics predictor 140, in particular the dynamic confidence coefficient generator 146, as discussed in connection with FIG. 1. At operation 306, a prediction error between an observation in the time series data and a previous prediction of the observation is determined. The prediction error may be repeatedly determined in a continuous prediction process where predictions of a metric are repeatedly generated for different time steps in the future. The continuous prediction process may maintain a prediction time horizon that is a set number of time steps ahead of the actual observations of the metric.

At operation 308, a standard deviation of a set of predication errors for the usage or performance metric is updated to include the prediction error. The set of prediction errors may include the entire history of prediction errors in the continuous prediction process, or only a subset of the prediction errors. In some embodiments, the subset of prediction errors includes the most recent number of prediction errors, such that the set represents a moving window. The inclusion of the additional prediction error into the standard deviation may be performed without completely recalculating the standard deviation from the prediction errors in the set.

At operation 310, a confidence coefficient is updated based on the prediction error and the standard deviation. The confidence coefficient is a value that is used to determine the prediction limit at each prediction step. This value may be carried forward from one prediction step to the next. The confidence coefficient may be updated at each prediction step based on additional prediction error, such that it is adaptive to the prediction errors during the continuous prediction process.

At operation 312, a prediction limit for the usage or performance metric at the time horizon is determined using the expected value, the standard deviation, and the confidence coefficient that was determined in operation 310. The prediction limit may define a prediction band around the expected value, to account for the uncertainty of the prediction. Because the prediction limit is determined using the confidence coefficient in operation 308, the prediction limit may be adaptive to the prediction error.

At operation 314, an event may be generated based on a determination that a subsequent observation of the usage of performance metric at the time horizon is outside the prediction limit. Alarms are one type of event. Alarms may be defined in the alarm generator to trigger in response to certain alarm conditions. The alarm conditions may depend on predictions of the metric or subsequent observations of the metric. For example, an alarm may be generated if a subsequent observation of the metric falls outside the prediction limit of the metric determined in a previous prediction. In some embodiments, an event may be transmitted via an event notification service in a service provider network to other entities, which may perform certain programmatic actions in response to the event.

Figure 4:
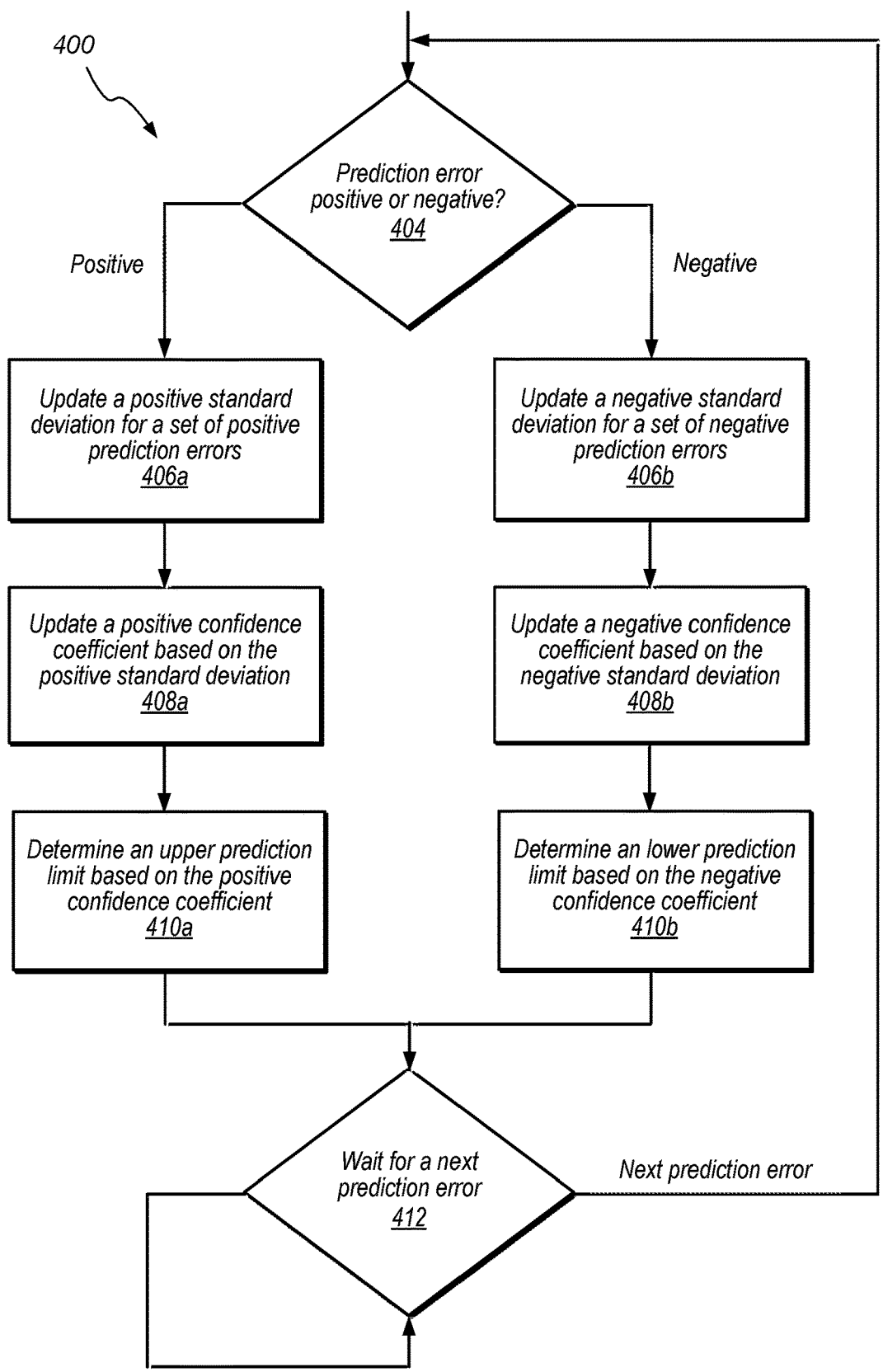
FIG. 4 is a flowchart diagram illustrating a process of operating a metrics prediction system, according to some embodiments.

FIG. 4 is a flowchart diagram illustrating a process of operating a metrics prediction system, according to some embodiments. The operations in FIG. 4 may represent a refinement or variation to the dynamic confidence coefficient generation process 320 shown in FIG. 3. The operations of FIG. 4 may be performed by the metrics predictor 140, as discussed in connection with FIG. 1. However, in other embodiments, the operations of FIG. 4 may be used in prediction system other than the system depicted in FIG. 1. As one example, the operations of FIG. 4 may be implemented in a web server that tracks and makes predictions about web traffic patterns.

At operation 404, a determination is made whether a prediction error is a positive or a negative prediction error. A prediction error is positive when the expected value of the prediction is greater than the actual observed value, and negative when the expected value of the prediction is less than the actual observed value.

At operations 406a and 406b, either a positive standard deviation for a set of positive prediction errors is updated, or a negative standard deviation for a set of negative prediction errors is updated, depending on whether the prediction error in operation 404 is positive or negative. For example, a continuous prediction process may maintain two standard deviations, one for positive prediction errors and one for negative prediction errors. At each prediction step, one of the two standard deviations may be updated.

At operations 408a and 408b, either a positive confidence coefficient is updated based on the positive standard deviation, or a negative confidence coefficient is updated based on the negative standard deviation. For example, the continuous prediction process may maintain two confidence coefficients from one prediction step to the next. At each prediction step, one of the two confidence coefficients may be updated.

At operation 410a and 410b, either an upper prediction limit is determined based on the positive confidence coefficient, or a lower prediction limit is determined based on the negative confidence coefficient. For example, the continuous prediction process may maintain both an upper prediction limit and a lower prediction limit from one prediction step to the next. At each prediction step, one of the two prediction limits may be updated.

At operation 412, the process 400 waits for a next prediction error. The next prediction error may be provided as a next observation for the metric is collected. The observed value may then be compared with an expected value of a previous prediction to generate a new prediction error. Once the next prediction error is available, the process 400 may cycle back to operation 404. The collection of new metrics observations and generation of new predictions may occur within a single prediction step of a continuous prediction process to repeatedly determine the upper and lower prediction limits for a prediction at each prediction step.

In this manner, process 400 implements a process where the upper and lower prediction limits can be updated independently. The upper prediction limit may change based on only positive prediction errors, and the negative prediction limit may change based on only negative prediction errors. Such a process may provide more precise prediction bands when the distribution of prediction errors is highly asymmetric. For example, during a time when a prediction model is repeatedly underestimating the value of a metric, process 400 may only increase the upper prediction limit and leave the lower prediction limit unchanged.

Figure 5:
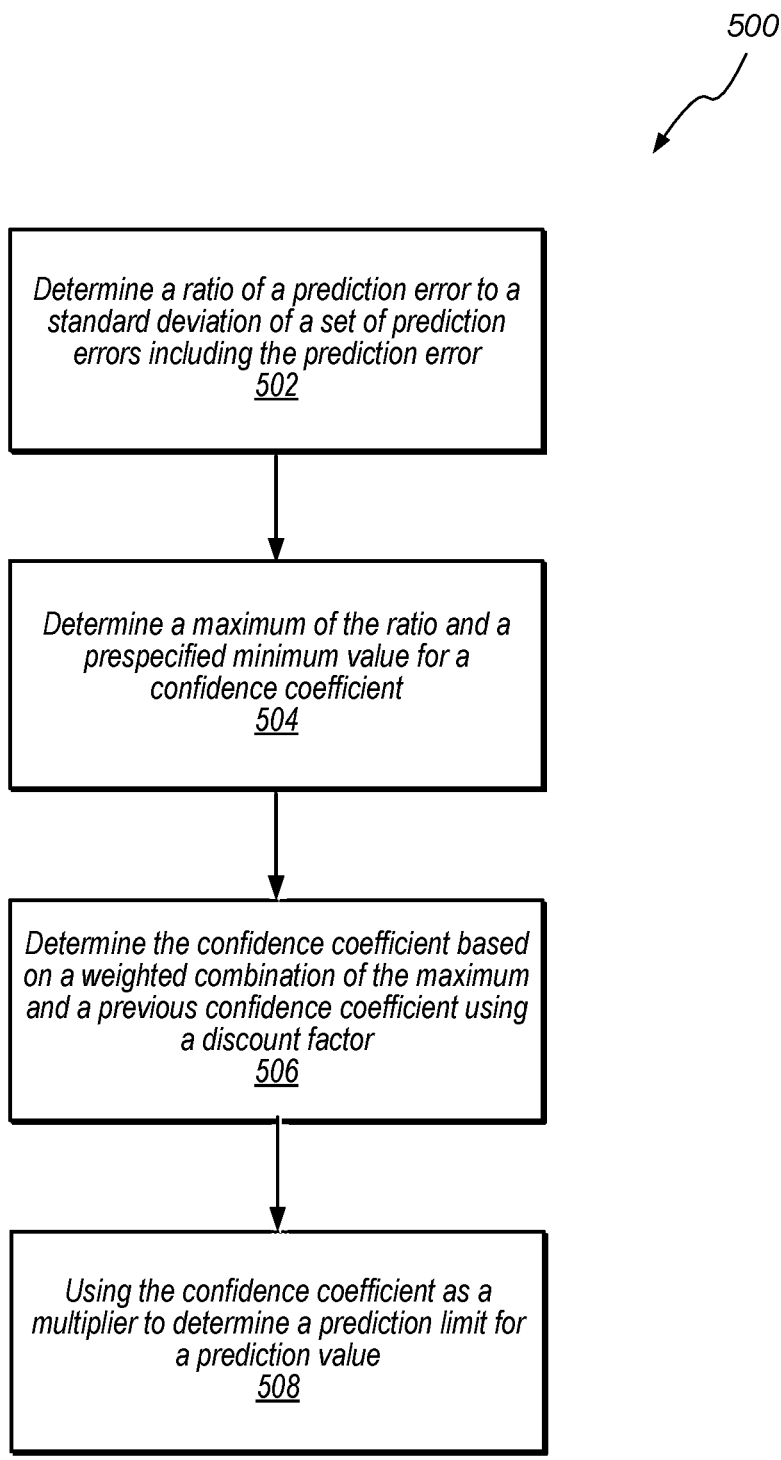
FIG. 5 is a flowchart diagram illustrating a process of operating a metrics prediction system, according to some embodiments.

FIG. 5 is a flowchart diagram illustrating a process of operating a metrics prediction system, according to some embodiments. The operations in FIG. 5 may represent a refinement or variation to the prediction limit adaptation process 320 in FIG. 3. The operations of FIG. 5 may be performed by the metrics predictor 140, as discussed in connection with FIG. 1. However, in other embodiments, the operations of FIG. 5 may be used in prediction system other than the system depicted in FIG. 1. As one example, the operations of FIG. 5 may be implemented in a web server that tracks and makes predictions about web traffic patterns.

At operation 502, a ratio of a prediction error to a standard deviation of a set of prediction errors including the prediction error is determined. For example, in a continuous prediction process, the standard deviation of prediction errors may be repeatedly updated from one prediction step to the next to include additional prediction errors. The inclusion of an additional prediction error into the standard deviation may be performed without completely recalculating the standard deviation from the prediction errors in the set. The determined ratio may represent an intermediate value for a confidence coefficient that corresponds to a confidence interval for the distribution of prediction errors that would have been sufficient to capture the new prediction error.

At operation 504, a maximum of the ratio and a prespecified minimum value for a confidence coefficient is determined. The prespecified minimum value may be an initial value of the confidence coefficient that is determined before the start of the continuous prediction process. The prespecified minimum value may also be a user specified value. Operating 504 ensures that the resulting value from the operation does not fall below the prespecified minimum value.

At operation 506, the confidence coefficient is determined based at least in part on a weighted combination of the maximum value from operation 504 and a previous confidence coefficient, using a weight factor. The weight factor may be a value $\beta$ between 0 and 1. The weight factor $\beta$ may be multiplied to the previous confidence coefficient and $(1-\beta)$ may be multiplied to the maximum value from operation 504, and the two results may be combined to produce a weighted sum. In some embodiments, operation 506 may implement an exponential smoothing of the confidence coefficient using $\beta$ as the smoothing factor. In some embodiments, the confidence coefficient may be rounded to an integer. The rounding may be used to eliminate unneeded precision from the computation of the previous operations, and to facilitate their usage with other operands. In some embodiments, the weighted sum may be rounded up to an integer that is the nearest larger integer.

At operation 508, the confidence coefficient is used as a multiplier to determine a prediction limit for a prediction value. The confidence coefficient may be multiplied to the standard deviation of past prediction errors. The result of such a multiplication may then be added to or subtracted from an expected value of a prediction to produce the upper or lower prediction limit of the prediction.

Figure 6:
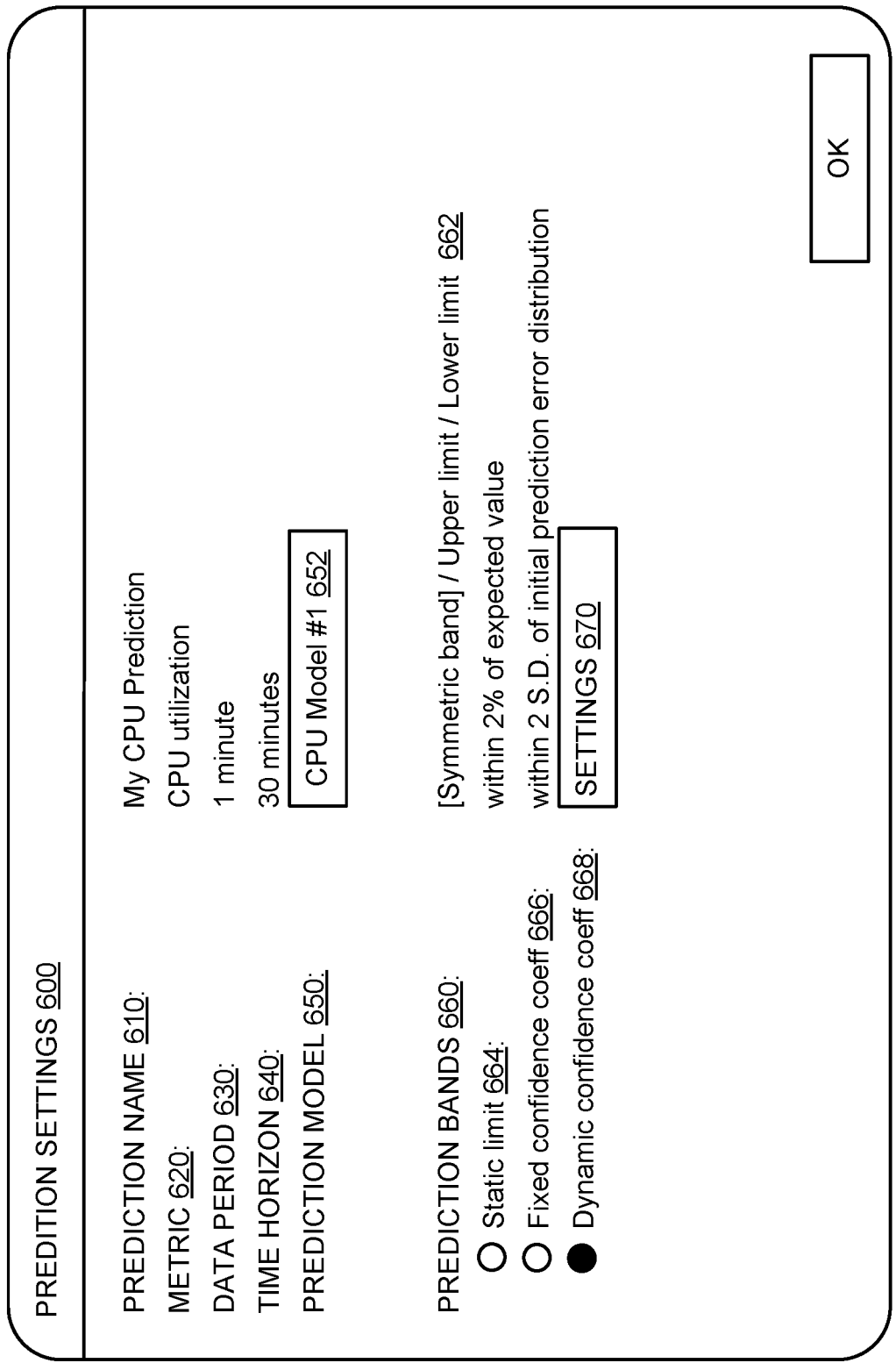
FIG. 6 illustrates a user interface to configure prediction settings in a metrics prediction system, according to some embodiments.

FIG. 6 illustrates a user interface to configure prediction settings in a metrics prediction system, according to some embodiments. The view in FIG. 6 may be communicated via client interface 132 of the resource monitoring service 110 to be displayed on a client 102. As discussed in connection with FIG. 1, the resource monitoring service 110 may provide a GUI to a client 102 to allow the client 102 to configure and manage various aspects of its operation. In some embodiments, the resource monitoring service 110 may allow a client 102 to configure settings for the prediction of a metric, as shown in FIG. 6.

The user interface may include a panel or a view 600 titled PREDICTION SETTINGS, which includes a number of information elements and control elements to configure a particular prediction. The view 600 may display certain general information and settings for a prediction. For example, the view 600 may include a PREDICTION NAME 610 for the prediction, which may be a user-specified name such as "MY CPU Prediction." The view 600 may show the METRIC 620 that will be predicted, which may be for example "CPU utilization."

The DATA PERIOD 630 may specify how frequently predictions are made. In the illustrated example, the prediction process may make one prediction every 1 minute. The prediction process may rely on captured CPU utilization data that are received by, for example, the metrics collector 132. In one example, the rate that metrics is collected may be the same as the rate at which predictions are made. In such an example, every minute, a new prediction may be made incorporating a new observation of CPU utilization metric. The TIME HORIZON 640 may specify the time horizon for the prediction. In the illustrated example, the prediction process may make predictions that are 30 minutes into the future.

The view 600 may also include a selection element 652 for a PREDICTON MODEL 650. In the illustrated example, the selected prediction model is a model named "CPU Model #1." Such prediction models may be a time-series prediction model with parameters that are tuned using an initial training data set.

The view 600 may also include a section PREDICTION BANDS 660, which include information and control elements to configure settings for the prediction bands generated for the prediction. The section may include tabs 662, which allow a user to select the particular prediction limits that the settings apply to. The selections may include the "Upper limit," the "Lower limit," or "Symmetric band," in which case the upper and lower limit are set to behave symmetrically, and any chosen settings apply to both limits.

As illustrated, the PREDICTION BANDS 660 may employ static limits 664, fixed confidence coefficients 666, or dynamic confidence coefficients 668. A static prediction limit approach may simply fix the prediction bands to be plus or minus some percentage of the expected value determined by the prediction model. A fixed confidence coefficient approach may rely on a confidence coefficient that is determined before the start of the prediction process. The fixed confidence coefficient may not change based on the prediction errors experienced during the prediction process. The fixed confidence coefficient may be determined from the training data set that was used to tune the prediction model. Finally, the dynamic confidence coefficient approach 668 may employ a confidence coefficient that can be updated based on prediction errors during the prediction process. As shown, the view 600 provides a SETTINGS button 670 that allows a user to make further configurations for the dynamic confidence coefficient.

FIG. 7 illustrates a user interface to configure prediction settings in a metrics prediction system, according to some embodiments. The view in FIG. 7 may be communicated via client interface 132 of the resource monitoring service 110 to be displayed on a client 102. The view may be displayed on the client 102 in response to pushing the SETTINGS button 670 in FIG. 6.

The user interface may include a panel or a view 700 titled DYNAMIC CONFIDENCE COEFFICIENT SETTINGS, which includes a number of information elements and control elements to configure the determination of a particular dynamic confidence coefficient. The view 700 may include a setting 710 that allows a user to choose whether the positive and negative confidence coefficients should be determined from separate sets of positive and negative prediction errors. The view 700 may also include settings that allows the user to specify how the dynamic confidence coefficient determination process uses historical data. For example, the view 700 may allow the user to choose between an exponential smoothing method 720 and a moving window method 724. The exponential smoothing method may smooth the dynamic confidence coefficient by combining it with a previous dynamic confidence coefficient, discounted by a discount factor 722. The moving window method 724 may take a different approach, by limiting the set of prediction errors used to generate the coefficient to a subset of all previous prediction errors. For example, the prediction error set may be limited to just the most recent 20 samples, as specified by the window size setting 726.

The view 700 may also include various parameters that govern the calculation of the dynamic confidence coefficient. For example, setting 730 allows the user to specify a minimum value for the dynamic confidence coefficient. This value may default to an initial value for the confidence coefficient determined before the start of the prediction process. Setting 740 may allow the user to indicate whether rounding should be performed on the dynamic confidence coefficient. If so, setting 742 allows the user to specify the decimal place to round to. Here a value of zero indicates that the dynamic confidence coefficient should be rounded to an integer. In some embodiments, this integer is the nearest larger integer from the dynamic confidence coefficient.

Figure 8:
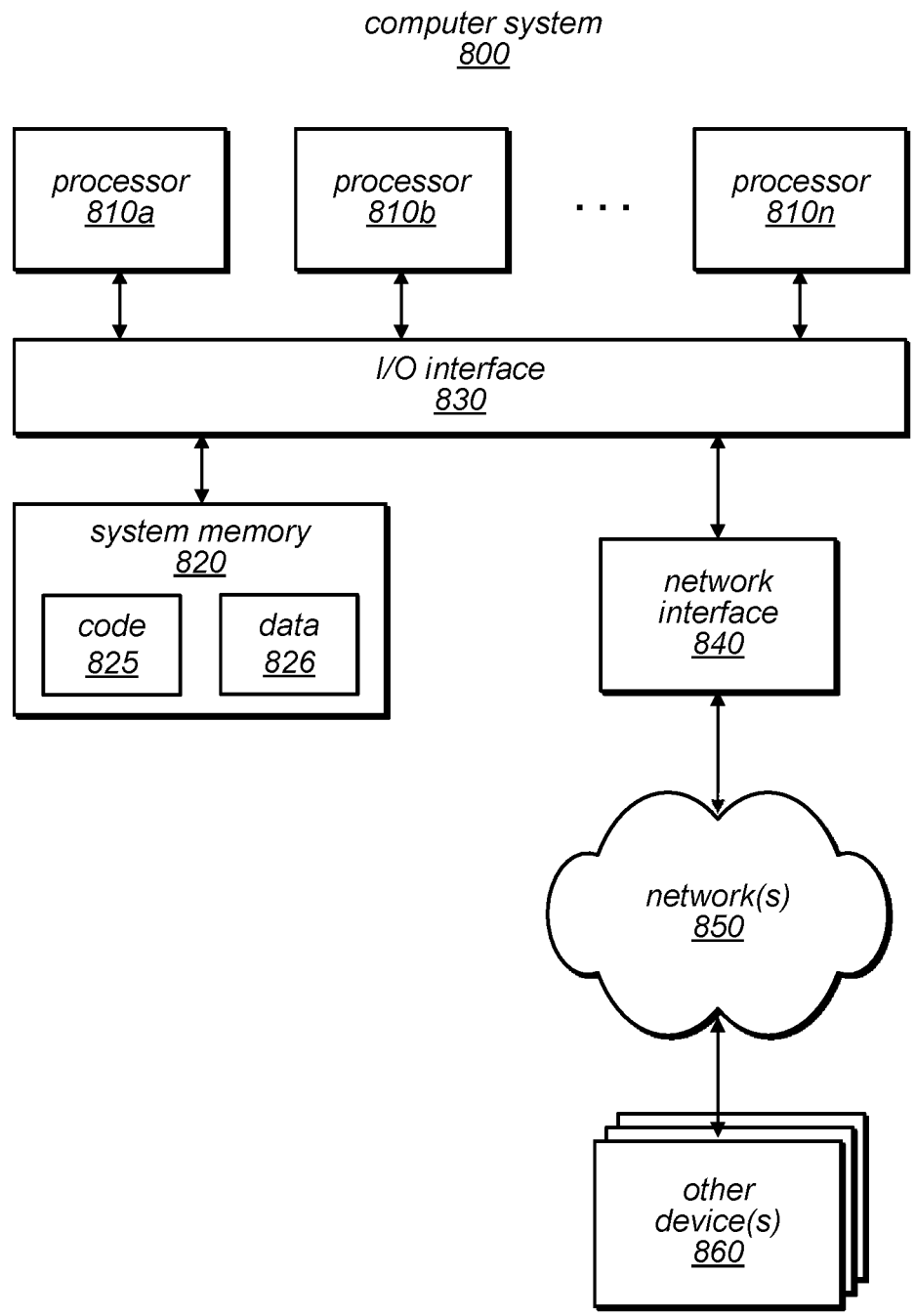
FIG. 8 is a block diagram illustrating an example computer system that can be used to implement one or more portions of a metrics prediction system, according to some embodiments.

FIG. 8 is a block diagram illustrating an example computer system that can be used to implement one or more portions of a metrics prediction system, according to some embodiments. Computer system 800 may include or be configured to access one or more nonvolatile computer-accessible media. In the illustrated embodiment, computer system 800 includes one or more processors 810 coupled to a system memory 820 via an input/output (I/O) interface 830. Computer system 800 further includes a network interface 840 coupled to I/O interface 830.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 920, may be incorporated directly into processor 810.

Network interface 840 may be configured to allow data to be exchanged between computer system 800 and other devices 860 attached to a network or networks 850, such as other computer systems or devices, such as routers and other computing devices, as illustrated in FIGS. 1 through 7, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above for FIGS. 1 through 7 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method, comprising:
    obtaining, by one or more computing devices comprising one or more hardware processors and memory, time series data for a usage or performance metric for one or more computing resources in a service provider network, the time series data comprising a plurality of observations recorded in a plurality of respective time steps, wherein the plurality of observations represent actual usage or performance for the one or more computing resources which occurred at the plurality of respective time steps;
    predicting an expected value for the usage or performance metric at a time horizon in the future based at least on the time series data and a time-series prediction model;
    determining a prediction error between an observation in the time series data and a previous prediction of the observation;
    updating a standard deviation of a set of predication errors for the usage or performance metric to include the prediction error;
    updating a confidence coefficient based at least on the prediction error, the standard deviation of the prediction error, and a previous confidence coefficient determined for the usage or performance metric;
    determining a prediction limit for the usage or performance metric at the time horizon based at least on the expected value for the usage or performance metric, the confidence coefficient, and the standard deviation;
    subsequent to the time horizon, obtaining a new observation for the usage or performance metric, wherein the new observation represents actual usage or performance that occurred at the time horizon for the one or more computing resources; and
    generating an event to perform an auto scaling action on the one or more computing resources in the service provider network, based at least on a determination that the new observation is outside the prediction limit.

2. The method of claim 1, wherein the updating of a standard deviation, the updating of a confidence coefficient, the predicting of an expected value, and the determining of a prediction limit are performed in a prediction time step that is repeated in a continuous prediction process.

3. The method of claim 1, wherein:
    updating the standard deviation comprises updating a positive standard deviation for a set of positive prediction errors, or updating a negative standard deviation for a set of negative prediction errors, depending on whether the prediction error is a positive error or a negative error;
    updating the confidence coefficient comprises updating a positive confidence coefficient based at least in part on the positive standard deviation, or updating a negative confidence coefficient based at least in part on the negative standard deviation; and
    determining the prediction limit comprises determining an upper limit based at least in part on the positive confidence coefficient, or determining a lower limit based at least in part on the negative confidence coefficient.

4. The method of claim 1, wherein updating the confidence coefficient is based at least in part on a ratio of the prediction error to the standard deviation.

5. The method of claim 4, wherein updating the confidence coefficient comprises determining a maximum of the ratio and a prespecified minimum value for the confidence coefficient.

6. The method of claim 5, wherein updating the confidence coefficient is based at least in part on a combination of the maximum and the previous confidence coefficient determined for the usage or performance metric.

7. A system, comprising:
a metrics collector implemented by a first set of one or more computing devices comprising one or more hardware processors and memory, configured to collect time series data for a usage or performance metric for one or more computing resources in a service provider network, the time series data comprising a plurality of observations recorded in a plurality of respective time steps, wherein the plurality of observations represent actual usage or performance for the one or more computing resources which occurred at the plurality of respective time steps;
a metrics predictor implemented by a second set of one or more computing devices, configured to:
predict an expected value for the usage or performance metric at a time horizon in the future based at least on the time series data and a time-series prediction model;
determine a prediction error between an observation in the time series data and a previous prediction of the observation;
update a standard deviation of a set of predication errors for the usage or performance metric to include the prediction error;
update a confidence coefficient based at least on the prediction error, the standard deviation of the prediction error, and a previous confidence coefficient; and
determine a prediction limit for the usage or performance metric at the time horizon based at least on the expected value, the confidence coefficient, and the standard deviation; and
an event generator implemented by a third set of one or more computing devices, configured to generate an event to perform an auto scaling action on the one or more computing resources in the service provider network, based at least on a determination that a new observation for the usage or performance metric collected by the metrics collector subsequent to the time horizon is outside the prediction limit, wherein the new observation represents actual usage or performance that occurred at the time horizon for the one or more computing resources.

8. The system of claim 7, wherein:
the one or more computing resources comprise one or more virtual machine instances hosted by one or more virtual machine hosts to implement a service in the service provider network, and
the time series data is generated from operation of the one or more virtual machines instances.

9. The system of claim 8, wherein to perform the auto scaling action comprises adding or removing, by an auto scaler of the system, a computing resource in the service provider network to or from an auto scaling group in response to receiving the event.

10. The system of claim 7, wherein the event generator is configured to generate an alarm to a client device based at least in part on a determination that new observation for the usage or performance metric at the time horizon is outside the prediction limit.

11. The system of claim 7, wherein the metrics predictor is configured to perform the updating of a standard deviation, the updating of a confidence coefficient, the predicting of an expected value, and the determining of a prediction limit repeatedly in a continuous prediction process.

12. The system of claim 7, further comprising a client interface server implemented by the one or more computing devices, configured to receive input from a client device to configure one or more parameters associated with the updating of the confidence coefficient.

13. The system of claim 12, wherein:
the client interface server is configured to receive input from the client device to modify a weight factor.

14. The system of claim 12, wherein:
the metrics predictor is configured to update the confidence coefficient based at least in part on a maximum of the ratio and a prespecified minimum; and
the client interface server is configured to receive input from the client device to modify the minimum.

15. A non-transitory computer-accessible storage medium storing program instructions that when executed on one or more processors cause the one or more processors to:
receive time series data for a usage or performance metric for one or more computing resources in a service provider network, the time series data comprising a plurality of observations recorded in a plurality of respective time steps, wherein the plurality of observations represent actual usage or performance for the one or more computing resources which occurred at the plurality of respective time steps;
predict an expected value for the usage or performance metric at a time horizon in the future based at least on the time series data and a time-series prediction model;
determine a prediction error between an observation in the time series data and a previous prediction of the observation;
update a standard deviation of a set of predication errors for the usage or performance metric to include the prediction error;
update a confidence coefficient based at least on the prediction error, the standard deviation of the prediction error, and a previous confidence coefficient determined for the usage or performance metric;
determine a prediction limit for the usage or performance metric at the time horizon based at least on the expected value, the confidence coefficient, and the standard deviation; and
generate an event to perform an auto scaling action on the one or more computing resources in the service provider network, based at least on a determination that a new observation for the usage or performance metric at the time horizon is outside the prediction limit, wherein the new observation represents actual usage or performance that occurred at the time horizon.

16. The non-transitory computer-accessible storage medium 15, wherein the program instructions when executed on the one or more processors cause the one or more processors to:
update a positive standard deviation for a set of positive prediction errors, or update a negative standard deviation for a set of negative prediction errors, depending on whether the prediction error is a positive error or a negative error;

update a positive confidence coefficient based at least in part on the positive standard deviation, or update a negative confidence coefficient based at least in part on the negative standard deviation; and determine an upper limit based at least in part on the positive confidence coefficient, or determine a lower limit based at least in part on the negative confidence coefficient.

17. The non-transitory computer-accessible storage medium 15, wherein the program instructions when executed on the one or more processors cause the one or more processors to repeat the updating of a standard deviation, the updating of a confidence coefficient, the predicting of an expected value, and the determining of a prediction limit in a continuous prediction process.

18. The non-transitory computer-accessible storage medium 15, wherein the program instructions when executed on the one or more processors cause the one or more processors to update the confidence coefficient based at least in part on a ratio of the prediction error to the standard deviation.

19. The non-transitory computer-accessible storage medium 18, wherein the program instructions when executed on the one or more processors cause the one or more processors to update the confidence coefficient based at least in part on a maximum of the ratio and a prespecified minimum value for the confidence coefficient.

20. The non-transitory computer-accessible storage medium 19, wherein the program instructions when executed on the one or more processors cause the one or more processors to update the confidence coefficient based at least in part on a weighted combination of the maximum and the previous confidence coefficient determined for the usage or performance metric, discounted by a weight factor.

* * * * *